United States Patent [19]

Westell

[11] 4,030,817
[45] June 21, 1977

[54] APODIZATION FILTER

[75] Inventor: William E. Westell, Weston, Mass.

[73] Assignee: The United States of America as represented by the Secretary of the Army, Washington, D.C.

[22] Filed: Mar. 22, 1976

[21] Appl. No.: 669,354

[52] U.S. Cl. .............................. 350/314; 350/205; 356/216

[51] Int. Cl.² ....................... G02B 5/22; G01J 1/56

[58] Field of Search ............. 350/205, 314, 162 SF; 250/203 R, 334; 356/216, 233, 234, 235

[56] References Cited

UNITED STATES PATENTS

| 2,972,276 | 2/1961 | Whitney | 350/314 X |
|---|---|---|---|
| 3,144,562 | 8/1964 | Orthuber et al. | 350/314 X |
| 3,510,581 | 5/1970 | Craiglow et al. | 350/314 X |
| 3,638,025 | 1/1972 | Dishington et al. | 250/203 R |

OTHER PUBLICATIONS

Gruber, et al., "On The Apodization of Coherent Imaging Systems," *Optical Engineering*, vol. 13, No. 5, Sept./Oct. 1974, pp. 451-454.

Hee, "Fabrication of Apodized Apertures for Laser Beam Attenuation," *Optics and Laser Technology*, Apr. 1975, pp. 75-79.

Levi, "Communications Theory Aspects of Optical Images," *Applied Optics*, vol. 1, Wiley & Sons, New York, 1968, pp. 124-160.

Wolf, "Apodisation," *Progress in Optics*, vol. III, Wiley & Sons, New York, 1964, pp. 29-186.

*Primary Examiner*—Ronald J. Stern
*Assistant Examiner*—John D. Lee
*Attorney, Agent, or Firm*—Nathan Edelberg; Robert P. Gibson; Kalman Pollen

[57] ABSTRACT

Improved apodization filter serving as the field stop of a scanning radiometer and attenuating unwanted light modulation signals when scanning edges of any field of view resulting in more accurate radiometric measurements.

8 Claims, 5 Drawing Figures

APODIZATION FILTER

The invention described herein may be manufactured, used and licensed by or for the Government for governmental purposes without the payment to me of any royalty thereon.

This invention relates to radiometric scanning systems and more particularly concerns an improved apodization filter for use therein.

Radiometric scanning systems are used in many military applications including forward looking infra-red radiometers, radiometric mappers, infra-red surveillance radiometers, velocity/height sensors, surface-to air missiles, and the like. In each of such radiometric scanning systems, the production of undesirable modulation signals when scanning edges of the field of view interfered with the measurement of the desired radiation signals.

In the past, attempts to solve this problem have focused on the use of radiometric spatial nulls exemplified by the sin $x/x$ variety, which were designed to eliminate the undesirable modulation signal. All such nulling devices, however, suffer the limitation that the null will only occur upon an exact registration of the scanning aperture and field stop, which is difficult to achieve and maintain.

It is thus a principal object of this invention to provide a reliable apodization filter which substantially attenuates the modulation signal when scanning the edges of a field of view with a radiometric scanning device.

Another object of this invention is to provide methods for fabricating spatial filters including apodization filters.

Other objects will be apparent from the following description which will be better understood by reference to the following drawings wherein.

Figure 1:
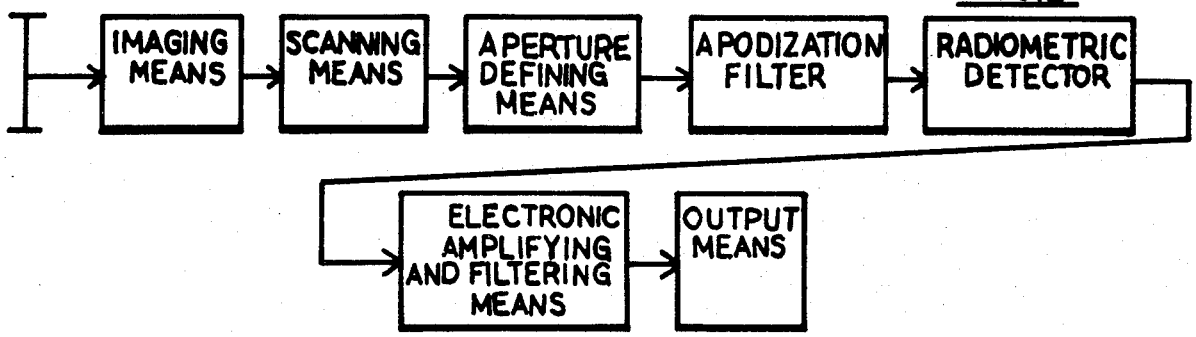
FIG. 1 is a diagrammatic view of a typical radiometric scanning system showing the respective location of my improved apodization filter.

Radiometric scanning systems as depicted in FIG. 1 survey a fixed or moving object and typically comprise the following: An Imaging Means such as a collector lens collects light energy from image I and directs the image formed thereby onto a Scanning Means which may be a moving reticle, lens, or mirror which will survey the formed image by moving it with respect to an Aperture Defining Means, typically a slit, reticle, or detector array. A Radiometric Detector, conveniently a photodiode transducer, provides an electric signal from the aperture defined image which is then amplified by a suitable Electronic Amplifying and Filtering Means and a desired signal selected therein for final processing by an Output Means. The Output Means may be, for example, a screen onto which the image is displayed, or it may be an electronic processor leading to a display screen, or alternatively it may be an electronic processor producing various voltages that may be fed back into the radiometric system.

Figure 2:
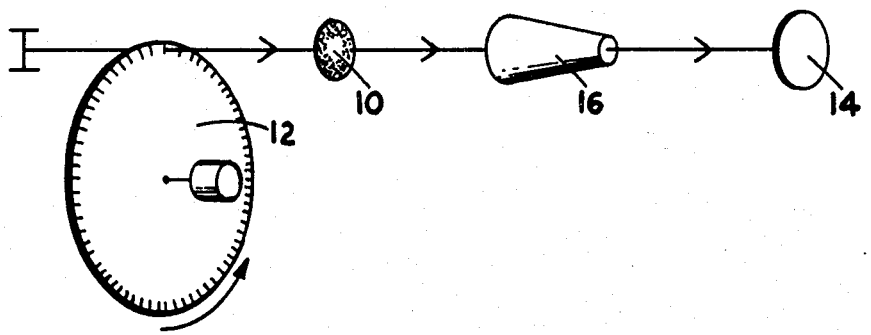
FIG. 2 is an exploded view of a portion of a radiometric scanning system.

Referring now to FIG. 2 where I represents the image to be scanned, my apodization filter 10 is placed rearwardly rotating reticle 12 which is represented by the Scanning Means and Aperture Defining Means of FIG. 1. The apodization filter, which defines a field of view, attenuates undesirable modulation signals caused by scanning the edges of that field of view and allows more precise measurement by the radiometric detector, which may be a photodiode 14. A cone condenser 16 condenses light passing through the filter onto the photodiode, the photodiode measuring the frequency at which the reticle cuts the image I.

Figure 3:
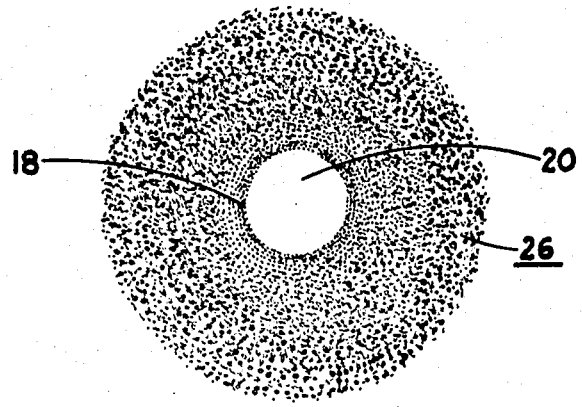
FIG. 3 illustrates an exposed photographic film, the central portion of which comprises my apodization filter.

My apodization filter (FIG. 3) comprising edges 18 and interior 20 serves as a field stop in a scanning radiometer and defines a field of view. I have discovered that an unusually high degree of attenuation of the interfering modulation signals at edges 18 of the filter and hence at the edges of the field of view, since the filter defines the field of view, may be achieved if transmittance at edges 18 varies with displacement as a cumulative Gaussian function. A cumulative Gaussian is the integral of a Gaussian. Interior 20 transmits essentially all light incident thereupon.

In producing an embodiment of my filter, (FIG. 4) a point light source (not shown) placed approximately 3–5 feet directly above the transparent cylinder 22, suitably of epoxy, and translucent symmetrical bubble 24, preferably acrylic, is focused through the cylinder and bubble in a dark room and thus exposing underlying photographic film 26, the portion of the film exposed directly under bubble 24 becoming the apodization filter. Other spatial filters besides apodization filters may be made in accordance with the above. The slope of the bubble will then be adjusted in such a manner that light passing therethrough to the film will produce therein the desired transmittance properties for the filter. The light source consists of a Xenon flash lamp with a pinhole aperture, the lamp producing a flash of collimated light of about 50 joules, of approximately one millisecond duration. Because the bubble is uniformly and homogeneously dispersed with light absorbing carbon particles therein, light passing through apex 30 of bubble 24 will traverse a multitude of carbon particles thus producing a very slight diffuse density in the film underlying the bubble. Diffuse density may be defined as the negative log of transmittance. Conversely, the diffuse density of the film produced under edges 32 of bubble 24 will be greater than under apex 30 since at edges 32, light will pass with less absorption to the film than at the apex. After film 26 has been exposed to light emanating from the pinhole aperture, the apodization filter which comprises that portion of film 26 which has been exposed directly under bubble 24 (Numerals 20 and 18 of FIG. 3) is then removed from the surrounding exposed film by excision thereof and may then be affixed, by any suitable adhesive means, to that end of condenser 16 which faces the reticle. In practice, the surrounding exposed film will be of sufficient size to permit both axial alignment of the filter with the condenser and adhesion thereto.

The precise method of producing the bubble and cylinder used in the exposure of film 26 as well as the method for determining the desired slope of the bubble are illustrated in the following procedures:

PROCEDURE I

Fabrication of the Bubble and Cylinder

Figure 4:
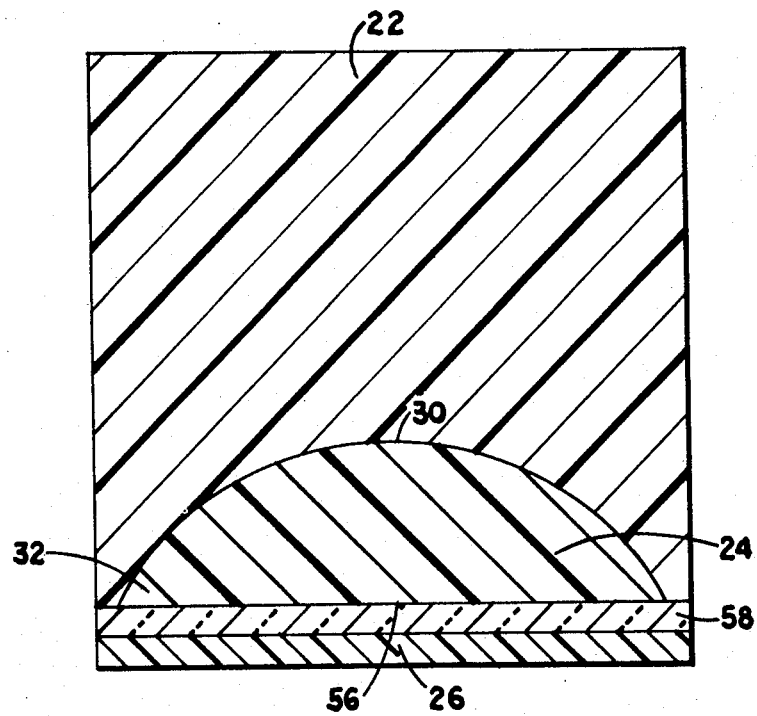
FIG. 4 is a cross-sectional view of a device used in producing an embodiment of my apodization filter.
Figure 5:
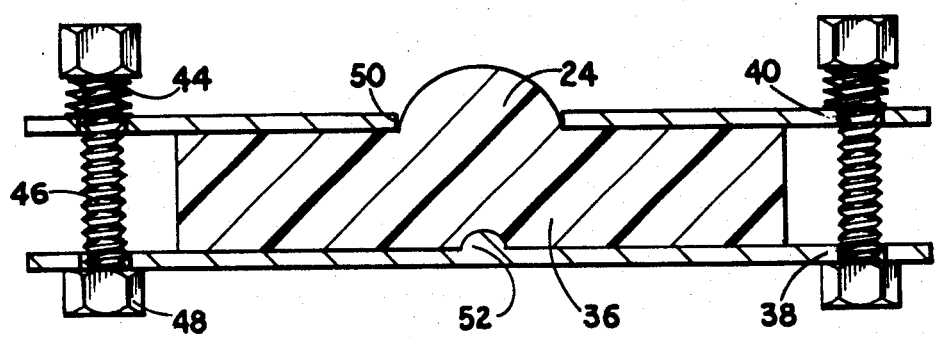
FIG. 5 is a sectional view of a device used in making a portion of the device depicted in FIG. 4.

Plastic sheet 36, (FIG. 5) about ⅛ inch in depth, 2 inches square, suitably acrylic, having therein carbon particles of about 0.000001 inch to 0.0001 inch in diameter, is sandwiched and secured between lower and upper metal plates, 38 and 40 respectively. Each metal plate is about 3 inches long, 2 inches wide, and 1/16 inch in thickness. Plastic sheet 35, with carbon particles included therein, should have an extinction coefficient, k, equivalent to a diffuse density change of about one unit per 0.005 inch thickness of plastic. The method of determining the value of k is outlined in the first paragraph of Procedure II below. The metal plates are equipped with springs 44, bolts 46, and nuts 48, the springs supplying a compressive force to plastic sheet 36. A circular aperture 50, about ⅜ inch in diameter, is centrally disposed in upper plate 40, and nib 52 is disposed centrally opposite the aperture, the nib being about ⅛ inch long and about ⅛ inch broad and projecting upwardly from lower plate 38. The sandwich comprising the metal plates and plastic sheet 36 is inserted into an open-ended refractory tube, suitably of stainless steel and heated with a heat gun for about 2 hours at approximately 250° F to effect uniform softening of the plastic sheet which because of compression by the plates is caused to bulge upwardly in the form of a bubble through aperture 50. After the aforementioned sandwich has cooled to room temperature the slope of the bubble is measured with an optical comparator, and the slope adjusted by turning nut 48 (see Example II for method of calculating slope). Next, plastic sheet 36 is removed from between the metal plates and an open-ended cylinder, suitably plexiglass, is placed over the bubble, into which cylinder is poured clear liquid epoxy preferably having the same refractive index as the bubble to form cylinder 22 as depicted in FIG. 4. After the epoxy solidifies (FIG. 4) cylinder 22 with bubble contained therewithin is cut from plastic sheet 36 at its upper surface. Next, bottom surface 56 of bubble 24 is polished with a fine abrasive cloth or polishing compounds and a glass cover slide 58 is cemented to the entire bottom surface of the resulting epoxy cylinder.

PROCEDURE II

Method For Determining Precise Slope y/x, of Bubble

First, using a linear step wedge, a Xenon flash lamp, a densitometer and the same photographic film material used in making the filter, diffuse density of the film versus its log of Exposure is recorded and plotted, and which is given by the following:

$$D = f(\log_e E) \qquad \text{Eq. (1)}$$

That is, $D$, diffuse density, is a function $f$, of log exposure $E$, where $e$ is the constant equal to 2.718. Next, one determines the value of the extinction coefficient, $k$, of the plastic used for the bubble by shining through a sheet of plastic of the same composition used for the bubble, a ray of light from the Xenon flash lamp the ray being of the same intensity and duration used when Eq. 1 was plotted to thus expose the underlying photographic film which is identical to the film material used for the filter. One then measures the thickness of plastic which is $y$ in Eq. (2) and (3), which produced the corresponding exposure E. One may conveniently determine the value of E by measuring with a densitometer the diffuse density of the resulting film and then selecting from the points and curve plotted when equation (1) was recorded and plotted, the value of E that corresponds to the aforementioned measured diffuse density. Then one substitutes these values of $y$ and E into Eq. (3) below to solve for $k$. Eq. (2) defines Bier's Law:

$$E = e^{-ky} \qquad \text{Eq. (2)}$$

from which it follows that $$y = -\log_e E/k \qquad \text{Eq. (3)}$$

The desired apodization occurs when transmission at the edges of the filter varies with displacement as a cumulative Gaussian, i.e.

$$T = \frac{1}{\sqrt{2\pi}\sigma} \int_{-\infty}^{x} e^{-\frac{1}{2}(x/\sigma)^2} dx \qquad \text{Eq. (4)}$$

where T represents transmission; $x$, the distance towards the interior of the bubble from the edges; and $\sigma$, the standard deviation of a cumulative Gaussian. Then by definition, diffuse density is $$D = -\log T \qquad \text{Eq. (5)}$$

or $$D = -\log \frac{1}{\sqrt{2\pi}\sigma} \int_{-\infty}^{x} e^{-\frac{1}{2}(x/\sigma)^2} dx \qquad \text{Eq. (6)}$$

Then one takes a given value of $\log_e E$ and the corresponding value of D from any one of the points recorded when plotting values for Eq. (1) supra. The value for $\log_e E$ may then be substituted into Eq. (3) to solve for $y$. Similarly, the corresponding value of D may be substituted into Equation (6) to solve for $x$; and hence the value of the slope of the bubble, $y/x$, is determined. In solving for $x$ in Eq. (6), $\sigma$ is quantified in the following manner: Starting with the requirement that the modulation transfer function (MTF) be a certain maximum required number at the reticle spatial frequency which number is characteristic for any radiometric scanning system, inquiry is made analytically whether the MTF is below that number by taking the Fourier transform of the cumulative Gaussian. The Fourier transform results in an equation. The spatial frequency of the MTF can be suitably scaled by way of the beforementioned equation which relates $\sigma$ to the MTF to satisfy this maximum numerical condition. In this Example, $\sigma$ is equal to ¾ of a line pair of the rotating reticle or equal to 0.0075 inch, a line pair being equal to 0.01 inch.

It is apparent from the above description that I have provided an improved apodization filter for a scanning radiometer which not only substantially eliminates unwanted modulation signals but is also conveniently and economically made and is reliable in operation.

I wish it to be understood that I do not desire to be limited to the exact details herein described, for obvious modifications will occur to a person skilled in the art.

I claim:

1. In combination with a radiometric scanning system including a scanning means, an aperture defining means, and a radiometric detector, the improvement therewith comprising an apodization filter interposed between said aperture defining means and radiometric detector, said apodization filter defining a field of view and comprising a light transmitting medium which comprises an interior portion and edges, said edges extending radially outwardly from said interior portion, said interior portion being of low and essentially uniform diffuse density such that said interior portion transmits substantially all incident light impinging thereupon, said edges having a diffuse density equal to $$-\log \frac{1}{\sqrt{2\pi\sigma}} \int_{-\infty}^{x} e^{-\frac{1}{2}(x/\sigma)^2} dx$$

where $x$ represents the distance towards the interior from said edges; $\sigma$, the standard deviation of a cumulative Gaussian; and $e$, the base $e$ having a value of 2.718.

2. Apodization filter according to claim 1 wherein said scanning means and aperture defining means comprise a rotating reticle, and said radiometric detector comprises a photodiode.

3. Apodization filter according to claim 1 wherein said light transmitting medium comprising said filter comprises exposed photographic film.

4. Process for forming an apodization filter for use in a scanning radiometer, said apodization filter serving as a field stop and defining a field of view and comprising a light transmitting medium, said apodization filter further comprising an interior portion and edges, said edges extending radially outwardly from said interior portion; said process comprising the steps of effecting in said interior portion a low and essentially uniform diffuse density such that said interior portion transmits essentially all incident light impinging thereon, and further effecting at said edges a diffuse density which is equal to $$-\log \frac{1}{\sqrt{2\pi\sigma}} \int_{-\infty}^{x} e^{-\frac{1}{2}(x/\sigma)^2} dx$$

where $x$ represents distance towards the interior from said edges; $\sigma$, the standard deviation of a cumulative Gaussian; $e$, the base $e$ having a value of 2.718.

5. Process according to claim 4 wherein said diffuse density of said light transmitting medium is produced by controllably exposing a photographic film to light.

6. Process according to claim 5 wherein said light exposing is controlled by means of a plastic bubble interposed between a light source and said photographic film.

7. Process according to claim 6 wherein said plastic bubble is acrylic material dispersed with carbon particles.

8. Process according to claim 6 wherein said bubble is formed by sandwiching and securing a plastic sheet between two metal plates comprising an upper and lower plate, said upper plate having an aperture therein, said lower plate having a nib raised on its upper surface opposite said aperture, applying a continuous compressive force to said plastic sheet through said metal plates, softening said sandwiched plastic sheet by heating so that said plastic sheet bulges upwardly at a point defined by said aperture in the form of a bubble, and adjusting the slope of said bubble by controllably applying further compressive force to said metal plates.

* * * * *